(12) United States Patent
Stratulate et al.

(10) Patent No.: US 11,698,155 B2
(45) Date of Patent: Jul. 11, 2023

(54) DOUBLE WEDGE LOCKING MECHANISM AND METHOD

(71) Applicant: GARTECH, LLC, Houston, TX (US)

(72) Inventors: Gary Warren Stratulate, Houston, TX (US); Gary Pendleton, Shotley Bridge (GB)

(73) Assignee: GARTECH, LLC, Houston, TX (US)

( * ) Notice: Subject to any disclaimer, the term of this patent is extended or adjusted under 35 U.S.C. 154(b) by 309 days.

(21) Appl. No.: 17/104,464

(22) Filed: Nov. 25, 2020

(65) Prior Publication Data

US 2021/0207644 A1 Jul. 8, 2021

Related U.S. Application Data

(60) Provisional application No. 62/956,531, filed on Jan. 2, 2020.

(51) Int. Cl.
*F16L 21/04* (2006.01)
*F16L 37/15* (2006.01)
*F16L 37/14* (2006.01)
*F16L 23/032* (2006.01)

(52) U.S. Cl.
CPC ............. *F16L 21/04* (2013.01); *F16L 37/144* (2013.01); *F16L 37/15* (2013.01); *F16L 23/032* (2013.01)

(58) Field of Classification Search
CPC ..... F16L 37/15; F16L 37/144; F16L 37/1225; F16L 37/123; F16L 21/04
USPC .......................................................... 285/323
See application file for complete search history.

(56) References Cited

U.S. PATENT DOCUMENTS

| | | | | |
|---|---|---|---|---|
| 3,594,023 | A | * | 7/1971 | Yano ........................ F16L 21/08 |
| 4,183,560 | A | * | 1/1980 | Wyss ........................ F16L 21/08 |
| 4,721,330 | A | * | 1/1988 | Woodhouse ............. F16L 21/04 |
| 5,037,141 | A | * | 8/1991 | Jardine ..................... F16L 23/04 |
| 6,106,029 | A | * | 8/2000 | DeMore ................... F16L 21/04 |
| 6,467,813 | B1 | * | 10/2002 | Takemura ......... F16L 27/12751 |
| 2014/0159361 | A1 | * | 6/2014 | Weir ....................... E21B 17/085 |
| 2017/0184232 | A1 | * | 6/2017 | Langhelle ........... F16L 23/0286 |
| 2017/0211734 | A1 | * | 7/2017 | Kawanishi .............. F16L 21/04 |
| 2019/0072216 | A1 | * | 3/2019 | Kang ...................... F16L 21/04 |

* cited by examiner

*Primary Examiner* — Zachary T Dragicevich
(74) *Attorney, Agent, or Firm* — Ewing & Jones, PLLC

(57) ABSTRACT

A double wedge locking mechanism provides an attachment mechanism to a liner system for fluid distribution network.

14 Claims, 8 Drawing Sheets

DOUBLE WEDGE LOCKING MECHANISM AND METHOD

CROSS-REFERENCE TO RELATED APPLICATIONS

The present application claims priority to U.S. Provisional Application 62/956,531 filed Jan. 2, 2020, the entirety of which is incorporated by reference.

STATEMENT REGARDING FEDERALLY SPONSORED RESEARCH OR DEVELOPMENT

None.

FIELD OF THE DISCLOSURE

Aspects of the disclosure relate to attachments to liner and piping systems. More specifically, aspects of the disclosure relate to providing an easily removable double wedge mechanism that interfaces with liners and piping systems used in a variety of applications, such as, in non-limiting embodiments, fluid transport systems.

BACKGROUND INFORMATION

Transport of fluids is an important part of many industrial processes. Fluids are transported through processing facilities and may be linked to other processes. Alteration of connections to the fluid transport systems are often necessary. Many times, the liner which directly carries the fluid may need to be changed. In other instances, the connections established to the liner must be changed.

When attachment is needed to be performed to an existing liner, conventional apparatus provide a two-piece screw assembly that is positioned adjacent to a liner support. In conventional apparatus, a binding or restraining force is created through a screwed attachment that acts upon one side of the support located on an exterior of the pipe. This configuration provides for a "drawing in" or retracting force to the liner support. While such conventional configurations provide for an attachment to the liner, there are several drawbacks to such conventional arrangements. Conventional arrangements do not provide any flexibility for attachments to such liners. Installation of the conventional handling problems often occur. Heavy nuts and apparatus are required to make attachment to existing liners. As weights increase for the components used to attach the liners, workers are prone to greater injury as such components are heavy and potentially dangerous to worker safety. Heavy cranes must be used to provide the necessary support and establishment of the connection.

Robust lifting equipment must be used to establish a connection with conventional apparatus, consequently field personnel are provided little flexibility in establishing a connection.

In certain industries, such as oil field services, attachments to liner systems can be an economic concern. Improper connection can lead to equipment shutdown and economic loss.

There is a need to provide a method and apparatus for installing attachments to fluid systems that use liners in a safe and efficient manner.

There is a further need to provide a method and apparatus to allow for attachments to be made to liners using simple hand tools.

There is a further need to provide a method and apparatus to allow for establishment of a connection to a liner that is more efficient than conventional apparatus attachments.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method of establishing a connection to a piping system is disclosed. In this non-limiting embodiment, the method discloses providing a liner to a piping system. The method further proposes inserting the liner into a flange adapter such that a support for the liner contacts the flange adapter. The method further provides for placing a double wedge arrangement, with an interface collar, placed over the liner and retained in place with a series of fasteners, interfacing with a main flange collar. The support for the liner is initially installed to the main machine flange via split collars enveloping a profile on the main machine flange, secured in place via a number of fasteners—threaded studs in the main liner support held in place with bolts and nuts and washers.

The liner is installed into the support and secured in place via a double wedge mechanism which interfaces with support services in the support and an interface clamp ring impinging to the liner. The double wedge is drawn into its final position by bolts and the action of the drawing of the wedges together imparts an axial motion to the interface collar on the liner. Compressive forces are generated via a wedge geometry securing the liner in place.

In one non-limiting embodiment, an arrangement for establishing a connection to a piping system is disclosed. In this non-limiting embodiment, the arrangement comprises a main flange adapter (existing unit), to which is attached a support housing. The support housing has a number of threaded stud fasteners to one end of the support housing. The threaded studs locate to two half clamps, which engage with the main flange adapter. During assembly, the support housing is located axially to the main flange adapter and secured in place with the two half clamps held in place by nuts and washers attached to the threaded studs. The combination of these elements locates the support housing axially to the main flange adaptor. The geometric interface between the support housing and the flange adaptor allows the support housing to be axially located, but still allows the support housing to rotate radially to aid the continued assembly process.

The support housing has a rectangular aperture running perpendicular to the support housing axis, for subsequent location of the double wedge elements.

The liner is located axially within the main flange adaptor. The liner provides a bearing surface to be acted upon to draw the liner into a final position with the main flange adaptor. With the liner located, a clamp ring is axially aligned to the liner and slid into place. The clamp ring is configured to have a radial face and two opposing tapered faces, the radial face locating to the bearing shoulder of the liner. The opposing tapered faces being exposed, such that once the double wedge elements are placed into the assembly they engage mating tapered faces. The wedges are introduced at two positions; an upper position (above the liner), and one in a lower position (below the liner). The wedges are drawn together by engaging two high tensile bolts (and washers). Tightening of the bolts compresses the wedges together, which in turn imparts a mechanical sliding motion across the mating tapered surfaces of the appropriate wedge and mating face of the clamp ring. The clamp ring impinges with the shoulder of the liner. The liner has restricted axial movement once located in the main flange adaptor, consequently, as the clamp ring moves axially, it impinges with the cylindrical shoulder of the liner, providing a compressive force to the liner, holding the liner in position.

In one example embodiment, an arrangement is disclosed. In this example embodiment, the arrangement provides a main housing with an aperture. The arrangement also provides for two half clamps, wherein a first of the half clamps is configured to interface with a second of the half clamps. The arrangement is further configured with a clamp ring with a clamp surface. The arrangement is further configured with a pair of wedges, wherein at least a portion of the pair of wedges is configured to interface with the clamp surface.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure briefly summarized above may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective combinations of embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In embodiments, aspects illustrated allow for connections to a liner. A liner may be a stand-alone component or may be part of another system, such as a piping system. Often, there is a need to place a flange, for example, onto a liner such that the liner may be connected with or to equipment. At other times, different types of equipment may also be needed to be attached to the liner, where the attaching equipment has a different flange arrangement.

In the illustrated embodiment, the liner may be a replaceable component of a fluid distribution system. To this end, the liner may be configured to be inserted, as necessary, into a section of the arrangement 100, as described below. A flange may also be installed behind the liner support to allow secure tightening of the arrangement 100. The arrangement 100 may be configured to include a double wedge locking mechanism without a flange or with a flange.

Figure 1:
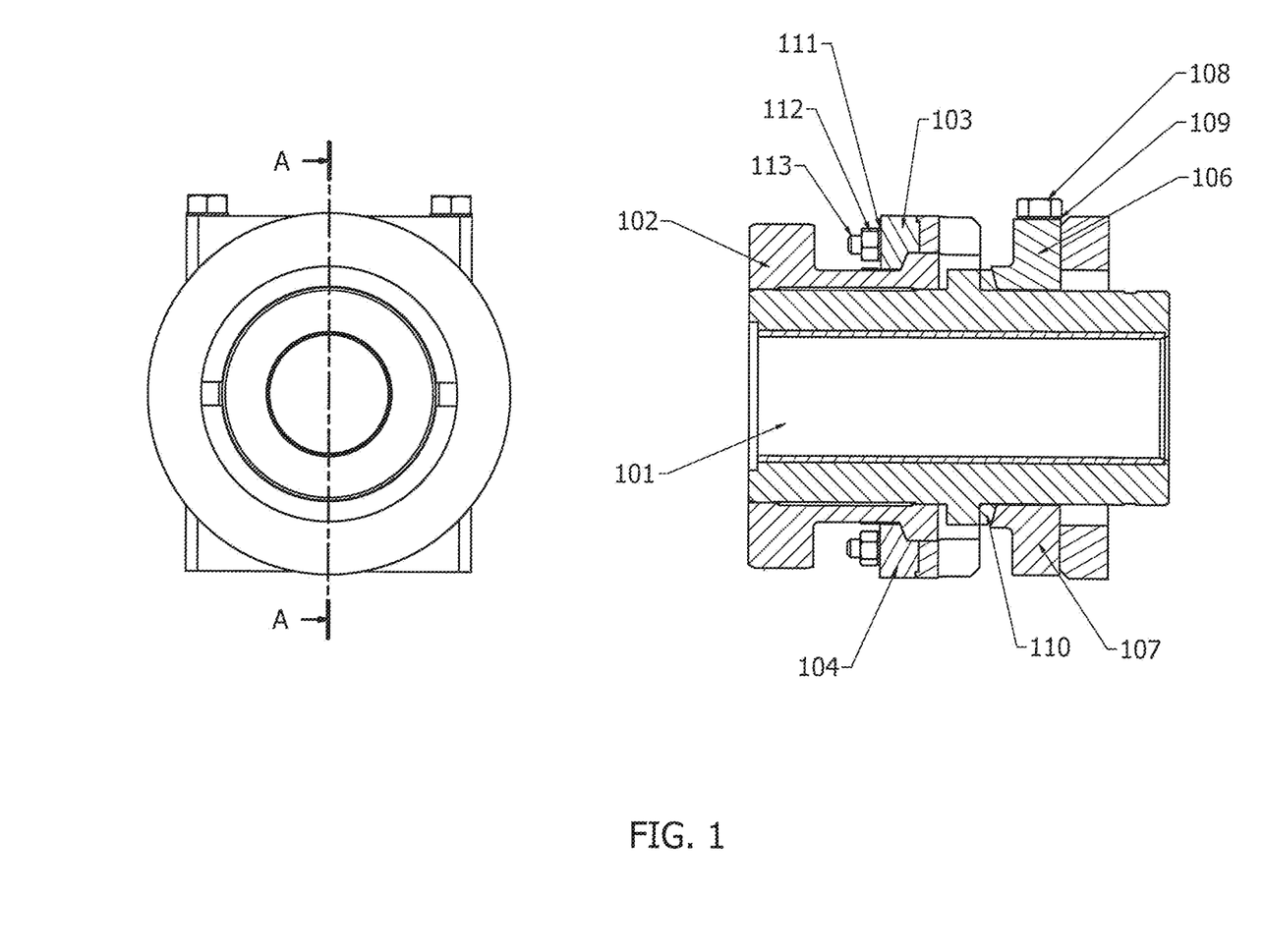
FIG. 1 is a cross-sectional view through a double wedge locking mechanism through the axis of the assembly.

Referring to FIG. 1, an arrangement 100 is disclosed that performs as a double wedge locking mechanism. The double wedge locking mechanism has a receiving flange 102. This receiving flange 102 provides the location and fitment for the double wedge locking mechanism. The arrangement 100 has a main body 105 that is aligned to the front of the main receiving flange 102. Half clamps 103, 104 are aligned to the main flange 102, located to the rear of the front of the main flange 102. Studs 113, located within the main housing 105, are configured to align with holes 114 in the half clamps 103, 104, thereby locating the main housing 102 in place with nuts 112 and washers 111. The subassembly of main housing 102 and half clamps 103, 104 are located to the front flange of the main housing 102. The subassembly is free to rotate and has limited axial movement due to the geometric configuration. As illustrated, the half clamps 103, 104 are configured to encompass the circumference of the liner. The studs 113 are configured with a threaded surface to allow the half clamps 103, 104 to attach.

Figure 2:
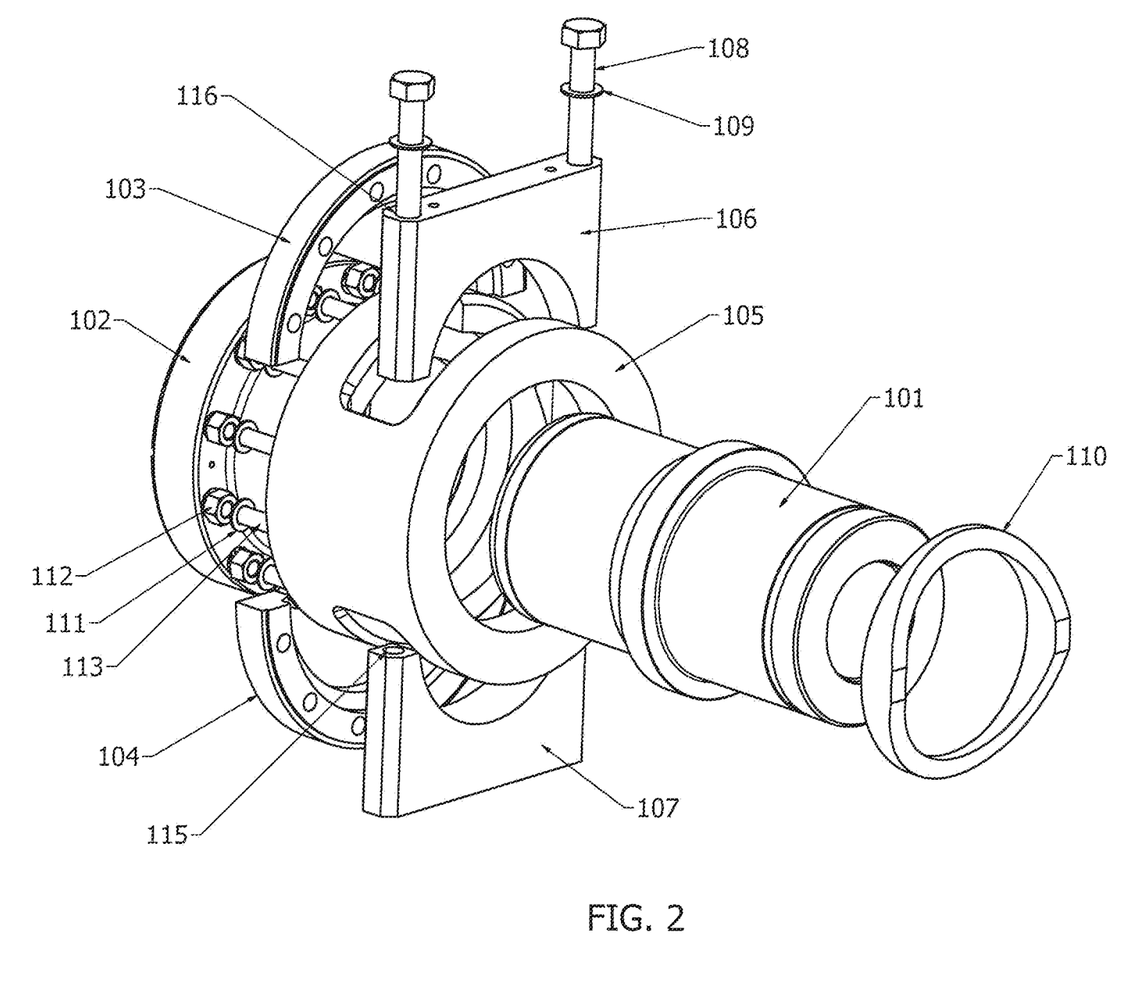
FIG. 2 is a perspective view of the double wedge locking mechanism in accordance with one example embodiment, viewed from the right side of FIG. 1.
Figure 3:
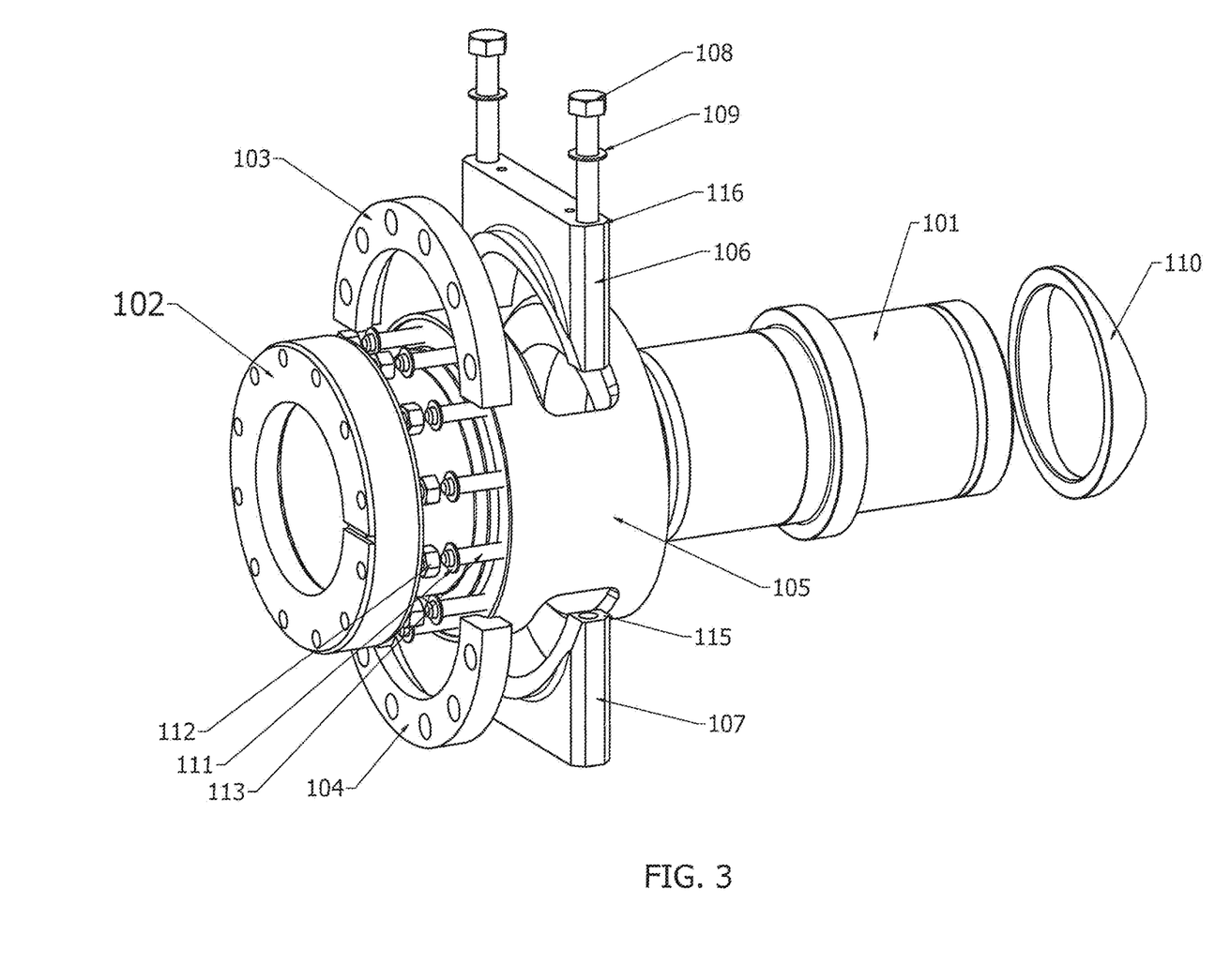
FIG. 3 is a perspective view of the double wedge locking mechanism in accordance with one example embodiment, viewed from the left side of FIG. 1.

Referring to FIGS. 2 and 3, the assembly of the liner 101 and the arrangement 100 is further detailed. The liner 101 is axially aligned to the main flange 102 and pushed into place. The liner 101 is then secured in place, by attaching the clamp ring 110 and sitting the clamp ring 110 against the liner 101 shoulder. The tapered faces of the clamp ring 110 are aligned to an upper and lower position exposed within the aperture of the main housing 105. In one example embodiment, the apertures of the main housing 105 are aligned in a 12 o'clock and 6 o'clock position to simplify the subsequent assembly of the double wedge mechanism.

The double wedges 106, 107 are installed in the main housing 105 apertures, in upper and lower positions. The double wedges 106, 107 have tapered faces to one side of each wedge, which are mated to the mating faces of the tapers on the clamp ring 110. Bolts 108 and washers 109 are placed in the receiving holes 116 of the upper wedge 106 and subsequently screwed into receiving thread 115 in lower wedge 107. As the bolts 108 are tightened, the mating surface of the wedge 106, 107 impinges on the clamp ring 110 and the aperture surface of the main housing 105. The sliding faces of the mechanism provides an axial loading of the clamp ring 110 and the aperture surface and the main housing 105, putting a compressive axial load to the liner 101 shoulder.

As the seating surface of the liner 101 is located to the fluid end (not shown), the compressive axial force generated by the double wedge mechanism (combination of items 101, 105, 106 and 107), the liner is effectively secured in place.

Further, the compressive axial force generated above causes the main housing 105 and half clamps 103, 104 to oppose the reaction forces, tightening the main housing 105 and half clamps 103, 104 against the main flange 102, eliminating the radial and axial movements available during the initial installment stage.

The radial and axial movement of the main housing 105 with half clamps 103, 104 achieved during the initial installation allow the user to orient the assembly to aid the final assembly process, (e.g. the lower half wedge 107). The arrangement 100 may be assembled in a receiving position which is easily accessed by the installer, then rotated to the lower operating position before the assembly of the upper wedge 106.

Although preferable to have the double wedges 106, 107 located in the upper and lower position, it is not essential, and can be rotated by the user to suitable operational positions during the final stage of tightening the double wedge mechanism.

In another non-limiting embodiment, the studs 113, nuts 112 and washers 111 can be replaced with bolts and washers located into receiving holes of the 114 of the half clamps 103 and 104 located into threaded portions in the main housing 105.

In a non-limiting embodiment, there are 12 off securing studs, nuts and washers and the quantity may be varied subject to appropriate loading requirements.

In another non-limiting embodiment, the size of the components will vary depending upon the size and type of liner to be used, as long as the double wedge mechanism operating principle is maintained.

In another embodiment, the main housing in the main flange adapter may be combined as one item, providing a support location for the liner and the receiving of the double wedge mechanism.

Figure 4:
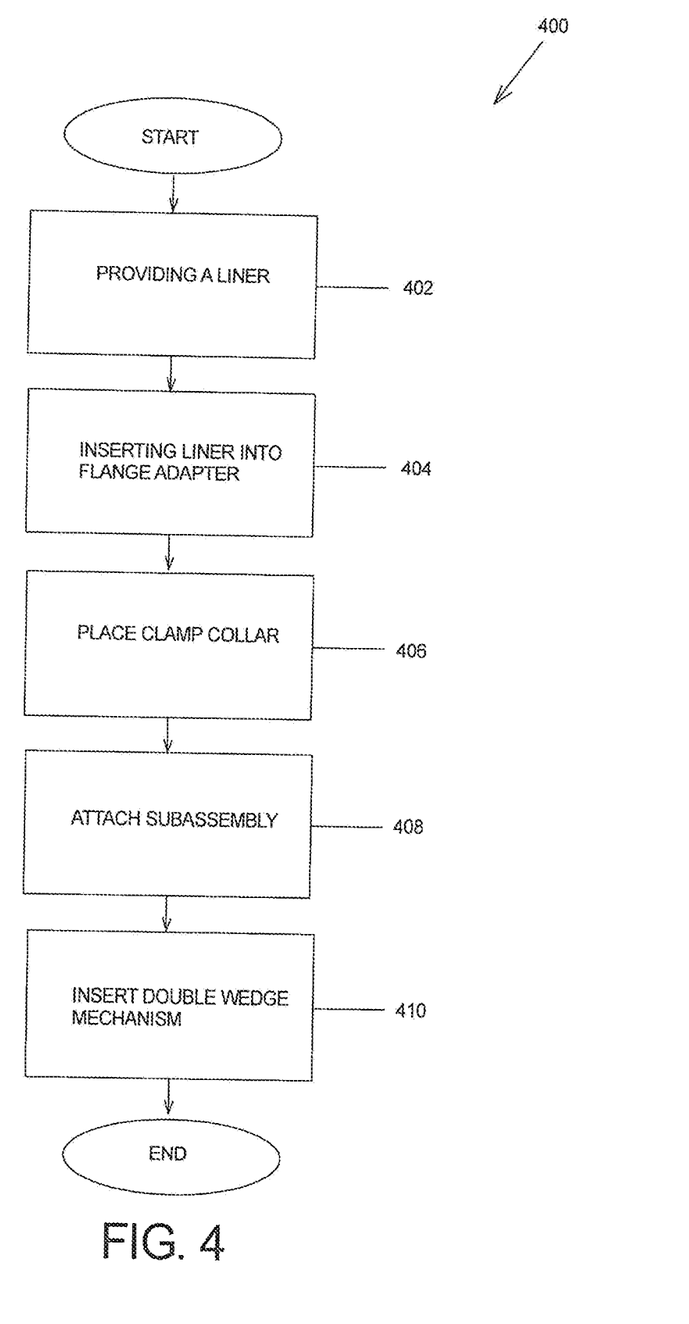
FIG. 4 is a method of connecting to a liner, in one example embodiment of the disclosure.

Referring to FIG. 4, a method 400 of establishing a connection to a piping system is illustrated. The method 400 may provide for, at 402, providing a liner of the piping system. At 404, the method provides for inserting the liner into a flange adapter such that a support for the liner contacts the flange adapter. At 406, the method provides for placing a clamp collar over an end of the liner to be located against a raised shoulder of the liner. At 408 the method provides for attaching a subassembly to a main flange to locate a position for a double wedge mechanism. At 410, the method provides for inserting the double wedge mechanism into a main housing creating a compressive axial force to the liner.

Figure 5:
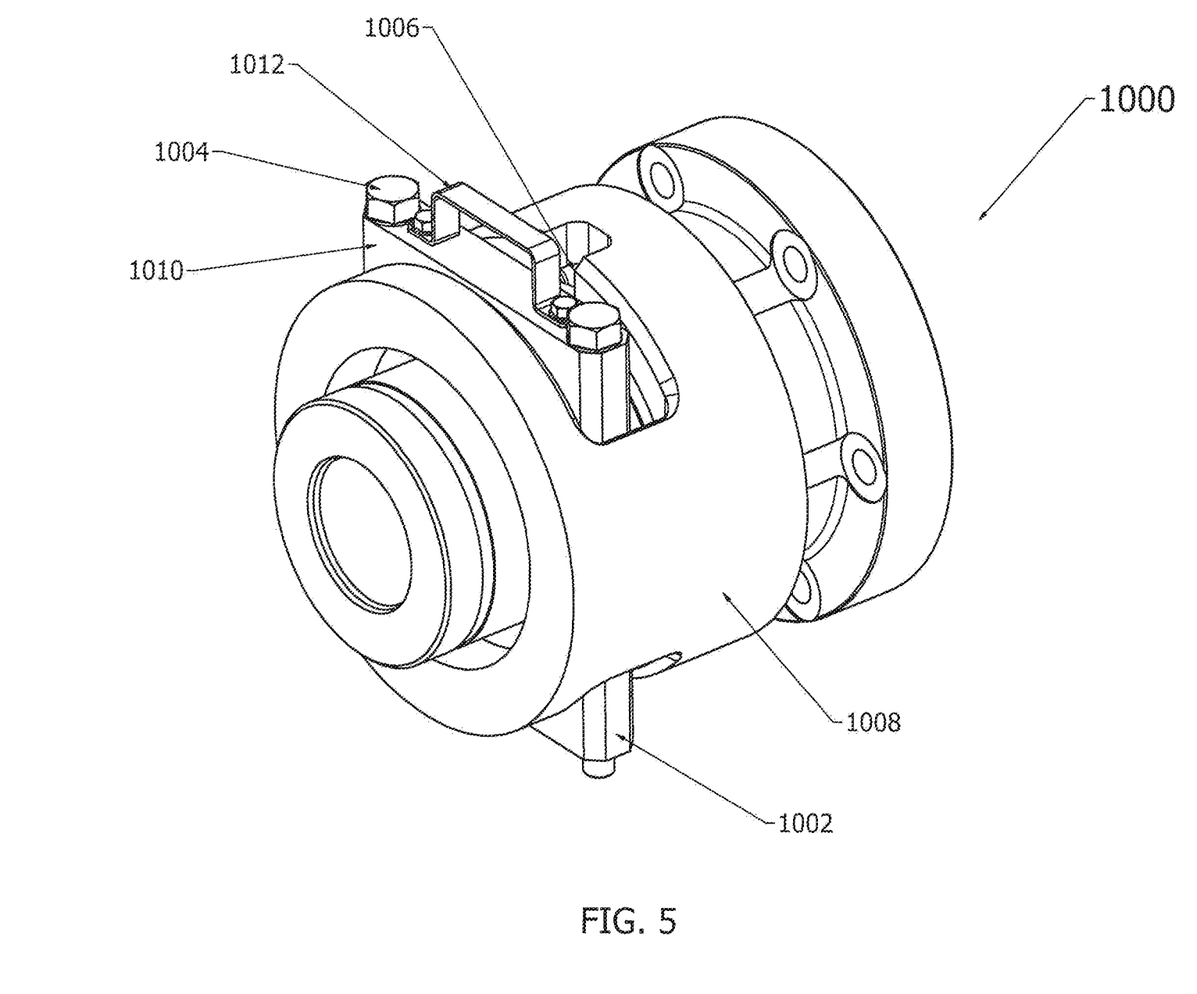
FIG. 5 is a perspective view of a second embodiment of the disclosure.
Figure 6:
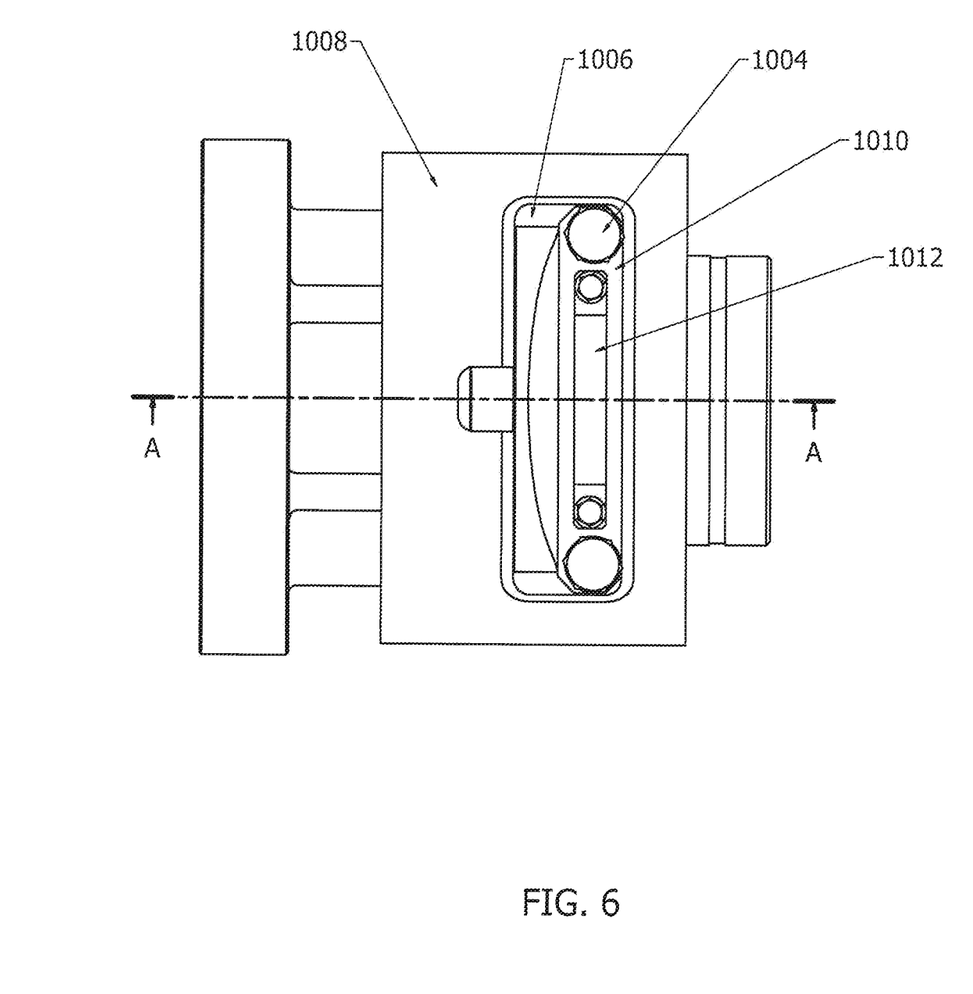
FIG. 6 is a side view of the second embodiment of FIG. 5.
Figure 7:
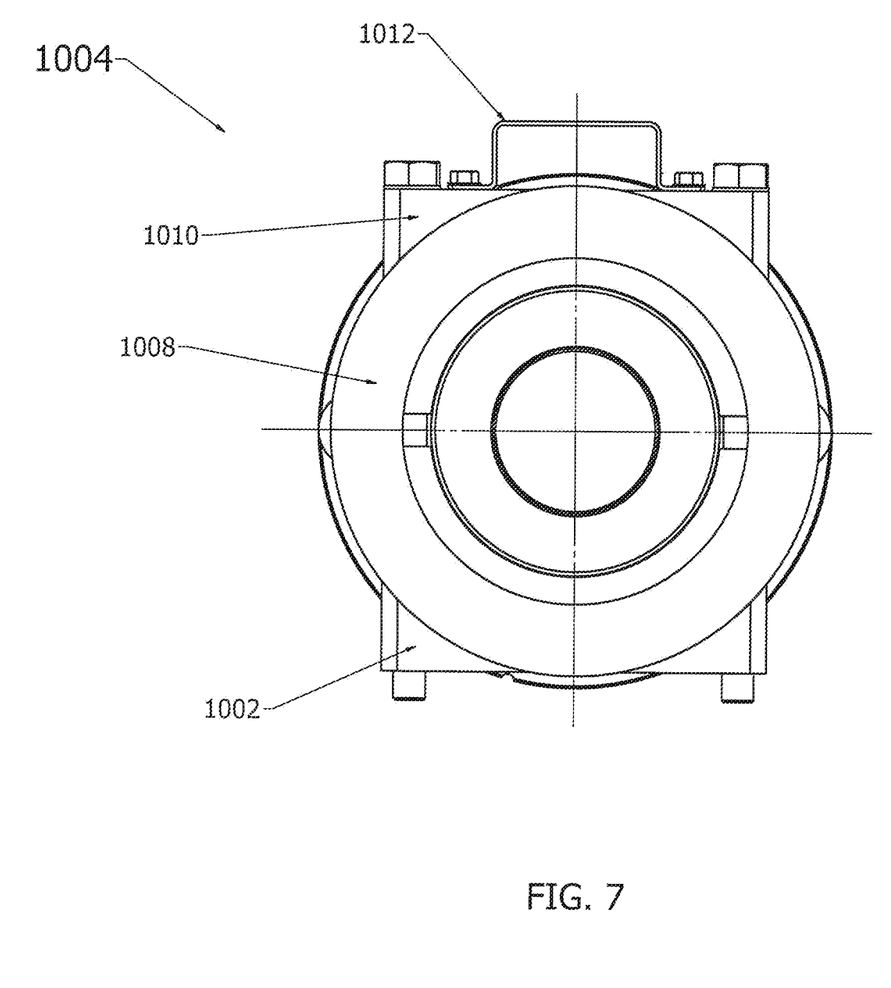
FIG. 7 is an end view of the second embodiment of FIG. 5.

Referring to FIG. 5, a second example embodiment of the disclosure is illustrated. In this embodiment, an arrangement 1000 is provided for connecting to a piping system. The arrangement 1000 has a main body 1008 that provides an aperture 1006 through which half clamps 1010, 1002 are inserted. Half clamps 1010, 1002 are secured to each other through bolting 1004. A handle 1012 is provided on a half clamp 1010 to allow for easy handling of the half clamp 1010 during installation. Referring to FIG. 6, the arrangement 1000 is shown in a side view elevation illustrating a cross section line A-A, described in FIG. 8. Referring to FIG. 7, an end view of the second example embodiment of the arrangement 1000 is illustrated.

Figure 8:
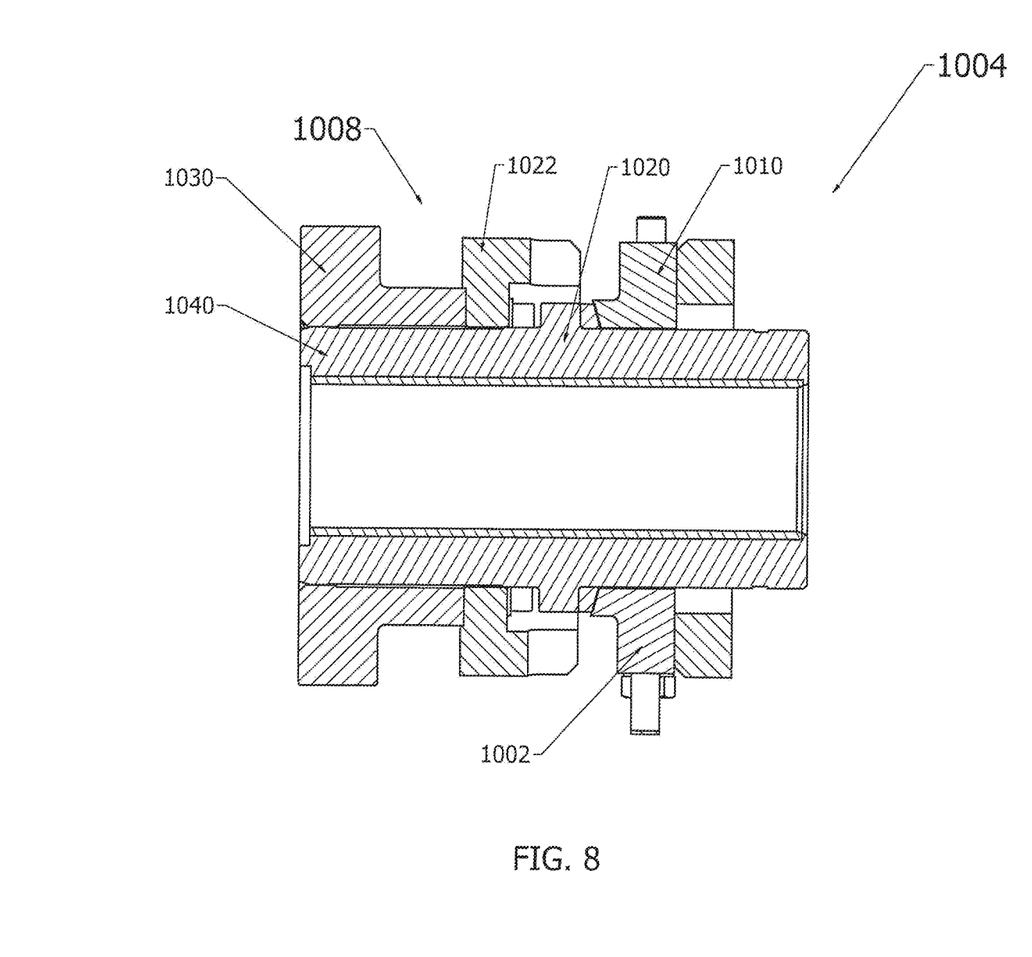
FIG. 8 is a cross-sectional view of the second embodiment of FIG. 5.

Referring to FIG. 8, the arrangement 1000 is configured to attach to a liner 1040. A body 1008 of the arrangement 1000 is configured to be inserted around the liner 1040 wherein a top half clamp 1010 and a lower half clamp 1002 are secured through an aperture in the arrangement 1000 through bolting 1004. A flanged portion 1030 of the liner 1040 is provided for connection of flanged piping. The body 1008 is provided with a bearing portion 1022 that is placed between the flanged portion 1030 and key portion 1020 of the piping system. In this configuration, the bearing portion 1022 bears upon the keyed portion 1020, preventing slippage. As illustrated, the top half clamp 1010 and the lower half clamp 1002 are also configured to bear upon the key portion 1020. As will be understood, the body 1008 of the arrangement may be slipped over an end of the existing piping arrangement liner 1040 and then the top half clamp 1010 and lower half clamp 1002 installed through the aperture previously described, to provide a bearing portion 1022 preventing the arrangement from slippage during use.

In one example embodiment, a method of establishing a connection to a piping system. The method may comprise providing a liner of the piping system and inserting the liner into a flange adapter such that a support for the liner contacts the flange adapter. The method may also provide for placing a clamp collar over an end of the liner to be located against a raised shoulder of the liner. The method may also provide for attaching a subassembly to a main flange to locate a position for a double wedge mechanism. The method may also provide for inserting the double wedge mechanism into a main housing creating a compressive axial force to the liner.

In another example embodiment, the method may be performed wherein the double wedge mechanism comprises two wedges.

In another example embodiment, the method may be performed wherein the two wedges interface with the main housing and the clamp collar.

In another example embodiment, an arrangement is disclosed. The arrangement is configured with a main housing with an aperture. The arrangement is further configured with two half clamps, wherein a first of the half clamps is configured to interface with a second of the half clamps. The arrangement is further configured with a clamp ring with a clamp surface. The arrangement is further configured with a pair of wedges, wherein at least a portion of the pair of wedges is configured to interface with the clamp surface.

In another example embodiment, the arrangement is configured wherein the interface between the first of the half clamps and the second of the half clamps is a threaded stud configuration.

In another example embodiment, the arrangement is configured wherein the interface is further configured with at least one nut arrangement.

In another example embodiment, the arrangement is configured wherein the interface is further configured with at least one washer arrangement.

In another example embodiment, the arrangement is configured wherein the arrangement is configured from stainless steel.

In another example embodiment, the arrangement is configured wherein the clamp ring is configured to interface on an inside surface with a liner.

In another example embodiment, an arrangement is described. The arrangement may comprise at least two studs, wherein the clamp ring is configured with a first series of holes to accept a first end of the at least two studs and the main housing is configured with a second series of holes to accept a second end of the at least two studs.

In another example embodiment, the arrangement is configured wherein the first series of holes is configured with threading to interface with threads on the at least two studs.

In another example embodiment, the arrangement is configured wherein the second series of holes is configured with threading to interface with threads on the at least two studs.

In another example embodiment, the arrangement is configured wherein each of the pair of wedges has a tapered face.

In another example embodiment, the arrangement is configured wherein the clamp ring is configured with at least two tapers.

In another example embodiment, the arrangement is configured wherein the at least two tapers are configured to interface with the pair of wedges.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of establishing a connection to a piping system, comprising:
    providing a liner of the piping system;
    inserting the liner into a flange adapter such that a support for the liner contacts the flange adapter;
    placing a clamp collar over an end of the liner to be located against a raised shoulder of the liner;
    attaching a subassembly to a main flange to locate a position for a double wedge mechanism; and
    inserting the double wedge mechanism into a main housing creating a compressive axial force to the liner.

2. The method according to claim 1, wherein the double wedge mechanism comprises two wedges.

3. The method according to claim 2, wherein the two wedges interface with the main housing and the clamp collar.

4. An arrangement, comprising:
    a main housing with an aperture,
    two half clamps, wherein a first of the half clamps is configured to interface with a second of the half clamps;
    a clamp ring with a clamp surface, the clamp ring defining a clamp collar;
    a pair of wedges, wherein at least a portion of the pair of wedges is configured to interface with the clamp surface, and
    a liner, the liner including a raised shoulder of the liner, the raised shoulder of the liner located against the clamp collar such that the clamp collar retains the raised shoulder to the main housing.

5. The arrangement according to claim 4, wherein first of the half clamps includes one or more holes formed therein, and wherein the main housing includes one or more corresponding threaded studs.

6. The arrangement according to claim 5, further comprising at least one nut coupled to the threaded stud, the nut positioned to secure the half clamp to the main housing.

7. The arrangement according to claim 6, further comprising at least one washer positioned about the threaded stud between the nut and the half clamp.

8. The arrangement according to claim 4, wherein the arrangement is configured from stainless steel.

9. The arrangement according to claim 4, further comprising: at least two studs, wherein the clamp ring is configured with a first series of holes to accept a first end of the at least two studs and the main housing is configured with a second series of holes to accept a second end of the at least two studs.

10. The arrangement according to claim 9, wherein the first series of holes is configured with threading to interface with threads on the at least two studs.

11. The arrangement according to claim 9, wherein the second series of holes is configured with threading to interface with threads on the at least two studs.

12. The arrangement according to claim 4, wherein each of the pair of wedges has a tapered face.

13. The arrangement according to claim 4, wherein the clamp ring is configured with at least two tapers.

14. The arrangement according to claim 13, wherein the at least two tapers are configured to interface with the pair of wedges.

\* \* \* \* \*